United States Patent Office 3,447,157
Patented May 27, 1969

3,447,157
APPARATUS FOR CONTROLLING THE OPENING OF A PARACHUTE
Jean Pierre Tranin, Fontenay-aux-Roses, France, assignor to U.S. Philips Corporation, New York, N.Y., a corporation of Delaware
Filed June 7, 1966, Ser. No. 555,899
Claims priority, application France, June 9, 1965, 20,022
Int. Cl. H01q 1/24
U.S. Cl. 343—702          6 Claims

ABSTRACT OF THE DISCLOSURE

This invention is an improved apparatus for controlling the opening of a load parachute used to support in flight a parcel which is dropped from a substantial height. A stabilization parachute is opened immediately after the parcel is dropped, the opening of this parachute automatically permitting the aerial to pivot to operable position and the radioelectric device therein to become operative. At a predetermined altitude the device signals an actuation means to open the load parachute for the remainder of the drop.

---

The invention relates to the positioning and starting of a radioelectric apparatus, in particular of an altimetric release, used in dropping material from aircraft.

According to the present invention the aerial of said apparatus is supported by a movable arm locked in the stored position in such manner that the said movable arm and the aerial of the said radioelectric apparatus are held against one of the side walls of the said material. The said movable arm is positioned perpendicularly to the said side wall when unlocking takes place under the action of the pull resulting from opening a parachute of small dimensions at the instant of dropping the material.

Figure 1:
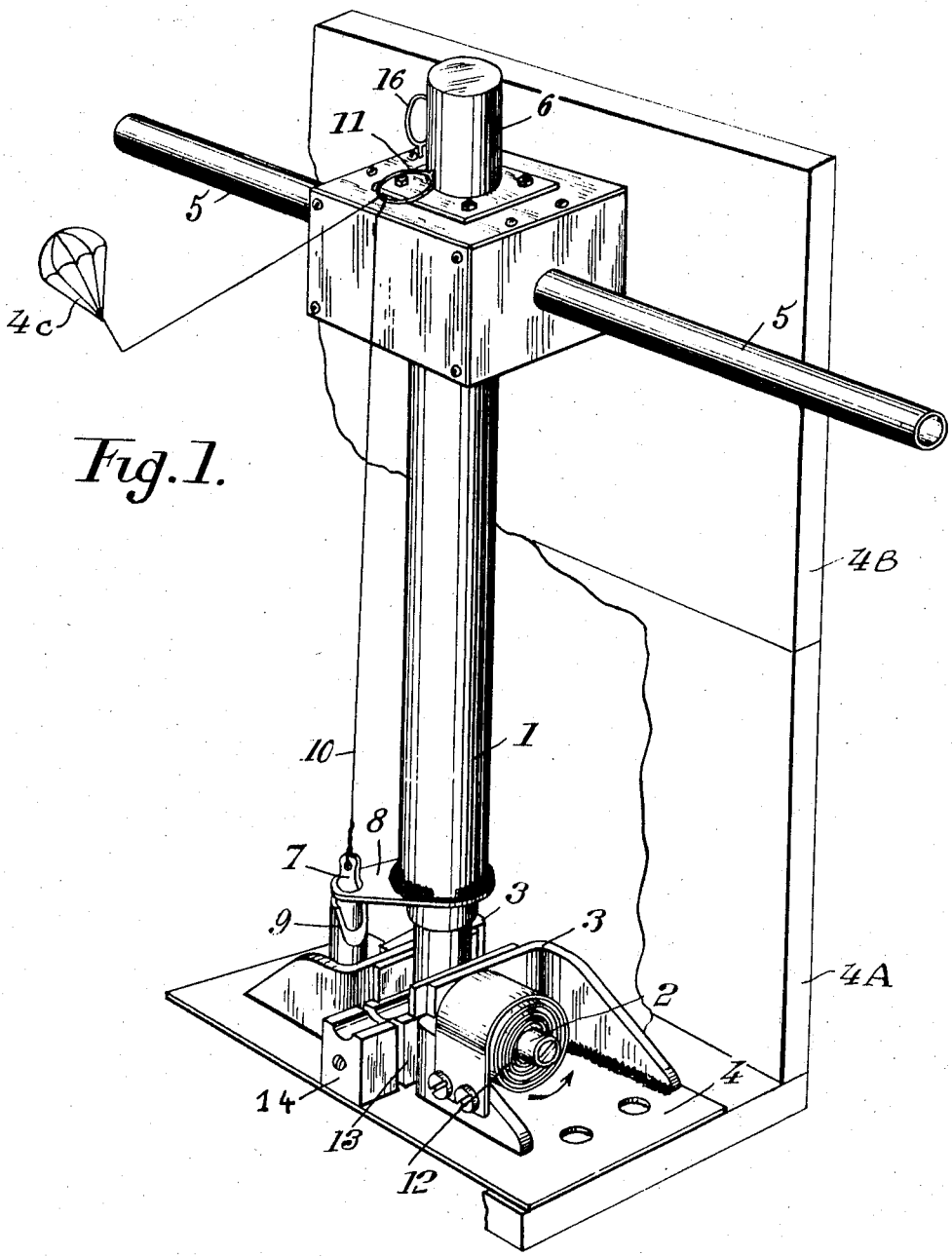
Figure 2:
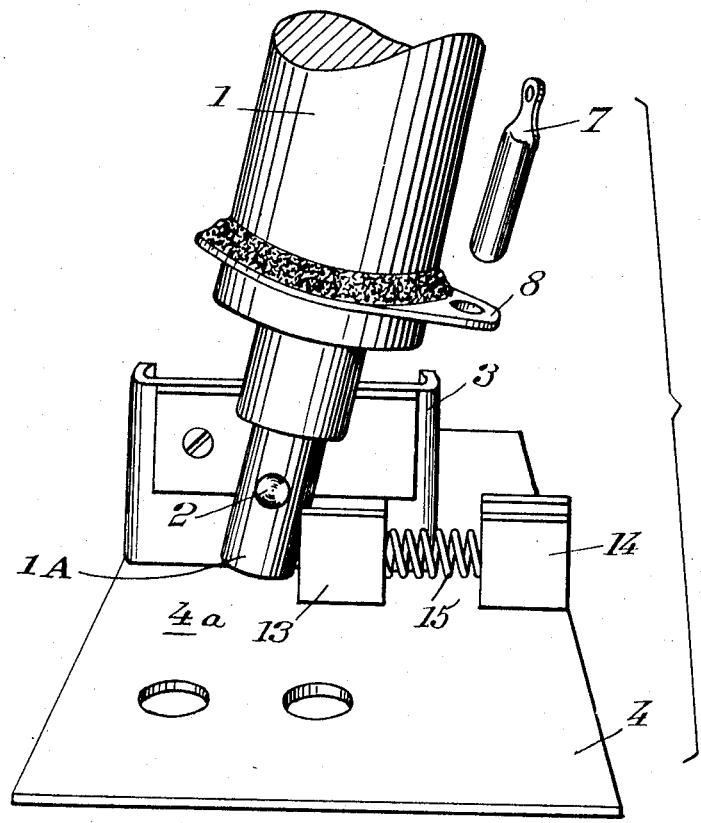

In order that the invention may readily be carried into effect, it will now be described in greater detail, by way of example, with reference to the accompanying drawings, in which:

FIG. 1 is a front perspective view of a preferred embodiment of the invention in the stored position; and FIG. 2 is a fragmentary perspective view of a detail of this embodiment.

The device comprises a movable arm 1 mounted on a shaft 2 supported by two plates 3 which are fixed on a base plate 4. The radioelectric apparatus is arranged inside the said movable arm 1 one end of which supports the two antennae of the aerial 5 and the supply battery 6. The arm 1 is held in the stored position by removable pin 7 which traverses a plate 8 which is fixed perpendicularly to the movable arm 1 and is inserted in a pipe 9 rigidly secured to the base plate 4. The plate is attached to the parcel 4A and its supporting parachute 4B.

The dropping of the parcel immediately opens a parachute 4C of small dimensions which will hereinafter be termed stabilization parachute and which has three functions: it prevents the parcel from turning about itself during its fall which would prevent a correct functioning of the device according to the invention; it provides the positioning of the device according to the invention; and it takes part in the control of opening the "load" parachute destined for slowing down the fall of the parcel to approximately 5 ms. per second at the instant of the impact.

In dropping the parcel the stabilization parachute is immediately opened which has for its effect that the cord 10 is stretched and the pins 7 and 11 withdrawn. The withdrawal of the pin 7 releases the movable arm 1 which, under the action of the spring 12, effects a rotation of 90° and is locked in the so-called "active" position. The withdrawal of the pin 11 connects a supply battery 6 into circuit.

FIG. 2, in which the pipe 9 and one of the plates 3 are not shown, shows the locking system of the movable arm 1 in its "active" position; said system consists of a slide 13 the upper surface of which comprises a semicircular groove, a member 14 which has a shape identical to that of the slide 13 but is rigidly secured to the base plate 4, and a spring 15 which is held taut between the slide 13 and the member 14 by the lower part 1a of the movable arm 1 when the latter is in the stored position. The rotation of the movable arm 1 releases the slide 13 which, under the action of the pressure of the spring, engages the arm at 1a below its pivot point on the shaft 2 and thereby prevents the arm from reassuming its initial position. The radioelectric apparatus then emits signals by which the altitude of the parcel can be determined by reflection from the earth. When the predetermined altitude for opening the "load" parachute is reached, an electric pulse is produced for exciting a pyrotechnical member which produces the rupture of the suspending ropes connecting the parcel to the stabilization parachute; the latter then produces a pull on a cord which produces the opening of the "load" parachute. To be sure that the radioelectric apparatus is in functioning order at the suitable instant, the pin 16 is retired a few instants before dropping the material which sets the preheating circuits under voltage.

What is claimed is:

1. In an apparatus attached to a parcel for controlling the opening of a load parachute used to support in flight the parcel which is dropped from a height, the apparatus including a stabilization parachute for initiating operation of the apparatus, a radioelectric device for activating means for opening said load parachute at a predetermined altitude, the improvement in combination therewith comprising:
   (a) a frame,
   (b) an arm having one end pivotally secured to the frame,
   (c) an aerial operatively connected to said radioelectric device and carried by a part of the arm remote from the secured end, the arm being pivotable from a stored position closely adjacent the parcel to an active position generally transverse to the stored position,
   (d) first locking means including a first release element for initially restraining the arm in said stored position,
   (e) a second locking means including a second release element for electrically activating said radio device, said stabilization parachute including a cord connecting this parachute to said first and second release elements, this parachute being openable immediately after the parcel is dropped and thereby pulling said release elements of said first and second locking means, releasing the arm to pivot and activating the radioelectric device,
   (f) spring means for pivoting said released arm to its active position, and
   (g) third locking means for automatically securing the arm in said active position.

2. Apparatus as defined in claim 1 wherein said first and second release elements are pins being withdrawable from corresponding apertures in the first and second locking means respectively.

3. Apparatus as defined in claim 1 wherein said first locking means further comprises a locking element fixedly extending from said arm, the locking element and the frame having aligned and adjacent apertures, and the releasing element being a pin which is initially disposed in said apertures and is removable therefrom.

4. Apparatus as defined in claim 1 wherein said third locking means comprises a spring-biased member movably mounted on said frame adjacent the secured end of said arm, said member being movable to a position between the end of the arm and the frame when the arm is moved to its active position, thereby precluding the arm from returning to its stored position.

5. Apparatus as defined in claim 1 wherein said arm is a substantially straight longitudinal member, and said aerial is a longitudinal member disposed generally perpendicular to the arm.

6. Apparatus as defined in claim 1 further comprising means for electrically switching on the radioelectric device to pre-heat its circuitry prior to the drop of said parcel.

References Cited

UNITED STATES PATENTS 1,306,145   6/1919   Hammond _____ 343—881

ELI LIEBERMAN, *Primary Examiner.*

U.S. Cl. X.R.

244—147; 343—705, 882

PO-1050
(5/69)

UNITED STATES PATENT OFFICE
CERTIFICATE OF CORRECTION

Patent No. 3447157          Dated     May 27, 1969

Inventor(s)   JEAN PIERRE TRANIN

It is certified that error appears in the above-identified patent and that said Letters Patent are hereby corrected as shown below:

Page 2, lines 4-11 of the application were omitted in printing and should be added at line 29 of column 1.

--It has been found that in dropping material by parachute the landing places of the parcels, under the action of the wind, may be far remote one from the other and also remote from the anticipated landing place, which may result in material losses. To increase the precision of the landing place it is consequently necessary to protect the parcels as long as possible from the action of the wind, so to drop them in free fall to a pre-determined altitude as measured by radioelectric apparatus, at which altitude a parachute is opened which slows down the fall.--

Signed and sealed this 16th day of June 1970.

(SEAL)
Attest:

Edward M. Fletcher, Jr.
Attesting Officer

WILLIAM E. SCHUYLER, JR.
Commissioner of Patents